United States Patent Office 2,772,946
Patented Dec. 4, 1956

2,772,946

PREPARATION OF DOUBLE FLUORIDES OF TITANIUM AND AN ALKALI METAL

Quentin H. McKenna, Cleveland, Ohio, assignor, by mesne assignments, to Horizons Titanium Corporation, Princeton, N. J., a corporation of New Jersey No Drawing. Application August 19, 1954,
Serial No. 451,061

13 Claims. (Cl. 23—88)

This invention relates to the production of complex salts of titanium in which the titanium has a valence less than four. More particularly, it has been discovered that complex alkali metal salts of titanium and fluorine may be prepared in which the titanium is trivalent or divalent and that such salts are characterized by a high degree of stability. Their preparation comprises reacting a complex alkali metal salt of titanium and fluorine, for instance potassium fluotitanate, with titanium carbide under carefully controlled conditions to produce the complex alkali metal (e. g. potassium) salt of titanium trifluoride or titanium difluoride or a mixture of the two.

The complex products formed are quite stable and may be handled with a minimum of precautions. They are useful in the preparation of titanium metal, for example, by electrolysis as described in the Morris A. Steinberg and Alfred A. Topinka application, Serial No. 262,886, filed December 21, 1951, in which instance they may constitute the entire salt bath to be electrolyzed or only a portion thereof; or in the field of ceramics or as catalysts, or they may find further utility in other diverse applications.

Various methods for the preparation of the fluorides of titanium have been described in the literature. Three general approaches have been tried as follows: (1) direct fluorination of titanium metal with either elemental fluorine or anhydrous hydrofluoric acid; (2) reduction of fluotitanates by hydrogen; and (3) solution of titanium dioxide in aqueous hydrofluoric acid. In each of these methods, the processes are unattractive because of one or more of the following factors: (1) the high cost of raw materials; (2) the need for complicated apparatus fabricated from special materials resistant to corrosive attack by fluorine or fluorine acids; (3) the complex operational techniques required, and (4) the instability of the prior art products which makes necessary particular care in their handling. (For example, both titanium tetrafluoride and titanium trifluoride are extremely hygroscopic and cannot be exposed to the atmosphere since they react with water and hydrolyze to form hydrofluoric acid and titanium dioxide.) Furthermore, none of the proposed methods have yielded titanium difluoride.

By means of the method herein described, each of the disadvantages of the prior art process is overcome and titanium difluoride hitherto unobtainable is readily prepared as a complex salt. The two raw materials employed—alkali metal fluotitanates and titanium carbide—are both relatively inexpensive and may be obtained as substantially pure substances. Furthermore, the titanium carbide may be easily prepared in the preferred state for carrying out the reaction, i. e. particles finer than 100 mesh, by techniques well known in the art. The apparatus need not be complex. A reactor made of an appropriate inert material and provided with means for heating to maintain any desired temperature in the range 700°–1100° C., with means for rapidly cooling the reactor, and with means for producing any desired atmosphere including a vacuum in the reactor suffices. The technique is simple and involves merely the weighing of the reactants, charging these reactants into a graphite crucible, placing the crucible in the reactor, sealing the unit by bolting a gasketed steel head in place, pumping out the air with a vacuum pump and replacing the air with an inert gas such as pure argon. The reactor is then heated to the desired temperature while argon is flowed continuously through the unit. After completion of the heating period, the reactor is rapidly cooled and the reaction product removed. The product is the complex salt of titanium trifluoride or titanium difluoride or a mixture of the two according to the reaction conditions.

Which of the several possible products is obtained by the method of the invention appears to be largely a function of the temperature at which the reaction is carried out as may be seen from the following reactions: At temperatures between 800° C. and 850° C. the reaction of one mol of titanium carbide with three mols of potassium fluotitanate produces the complex potassium salt of titanium trifluoride and carbon. At higher temperatures, 850° C. to 900° C., one mol of titanium carbide reacts with two mols of potassium fluotitanate to produce carbon and a mixture of the complex potassium salts of titanium trifluoride and titanium difluoride. At still higher temperatures, up to 1100° C. and preferably between 925° C. and 975° C., titanium carbide and potassium fluotitanate react in equimolar proportions to yield the complex potassium salt of titanium difluoride and carbon. Each of the above reactions proceeds virtually to completion and hence substantially quantitative yields may be obtained without waste of raw materials.

As previously noted, the raw materials are relatively inexpensive and are obtainable in a highly pure state. Typical potassium fluotitanate containing less than .01% water and less than .01% of insolubles is readily available. A typical titanium carbide may contain 0.075% oxygen, 0.038% hydrogen and 0.11% nitrogen. The titanium carbide may be produced by any of the prior art techniques. For example, it may be prepared by reacting titanium dioxide with pure carbon. It can then be used directly as sintered lumps, or ground to a fine powder or sintered into any desired shape. When the titanium carbide is employed in powder form (—100 mesh), the time for complete thermal reaction is shortest (e. g. 4 hours at 900° C.) while it is considerably longer when employing lumps or sintered rods (e. g. 12 hours with sintered rods ¼ inch in diameter having a bulk density of 2.5 grams per cc.). The sintered forms, if employed, possess an advantage, however, in the fact that the carbon remaining after carrying out any of the above thermal reactions retains the original shape of the sintered form and can therefore be readily removed from the salt product. Thus, the by-product carbon and any remaining unreacted titanium carbide are removed from the other reaction products by a simple mechanical operation.

The following examples are illustrative of the practice of this invention:

*Example I*

A graphite crucible was loaded with anhydrous recrystallized potassium fluotitanate ($K_2TiF_6$) and finely divided (—100 mesh) titanium carbide (TiC) in the proportions of 3 mols of the fluotitanate to one mol of the carbide. The loaded crucible was placed in a suitable reactor and the unit was sealed by bolting on the gasketed steel head. The air was pumped out by means of a laboratory vacuum pump and replaced with pure argon gas. The charge was heated to 850° C. and maintained at that temperature for 8 hours while 2 to 3 liters per minute of pure argon gas were flowed through the reactor. At the completion of the heating period the unit was rapidly cooled to room temperature in a pure argon atmosphere and the reaction product was removed from the unit. The product was found to be a deep reddish-brown colored salt cake. A thin layer of black flaky material was found at the top of the salt cake. The black material was scraped off and was identified as essentially carbon by X-ray examination. The rest of the salt cake was pulverized and a representative sample was analyzed for total titanium. The reddish-brown product analyzed (gravimetric), 24.7% titanium. Since this example corresponds to the conditions conducive to the formation of the trivalent fluotitanate wherein the theoretical product would contain 25% titanium, the reaction has gone 98.8% to completion for the formation of this complex potassium salt of titanium trifluoride.

A quantitative value for the concentration of trivalent titanium in the above product was obtained by dissolving a weighed sample of the salt in acidified potassium dichromate solution and the unreacted potassium dichromate back titrated with standardized thiosulfate solution. A salt sample weighing 1.30 grams was dissolved in a potassium dichromate solution containing 0.003 mol potassium dichromate (0.313 gram of chromium) and acidified with sulfuric acid. The solution was heated for ten minutes and then the unreacted potassium dichromate was determined by back titrating with thiosulfate solution. It was found that .198 gram of potassium dichromate remained after the oxidation reduction reaction between titanium trifluoride and potassium dichromate. Therefore, the weight of chromium that has been reduced by trivalent titanium ions is 0.313 minus 0.198 or 0.115 gram. Using this value of 0.115 gram of chromium in the following equation, one may calculate the weight of titanium trifluoride in the original salt sample:

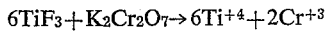

$$6TiF_3 + K_2Cr_2O_7 \rightarrow 6Ti^{+4} + 2Cr^{+3}$$

The value obtained was 0.318 gram of titanium trifluoride in the original salt sample. If the thermal reaction between potassium fluotitanate and titanium carbide had gone to completion then from the equation one can calculate a theoretical value of 0.325 gram titanium trifluoride in the above 1.30 gram salt sample. Since we have obtained a value of 0.318 gram of titanium trifluoride then the original thermal reaction went to 97.9% of completion based on the oxidation-reduction reaction with potassium dichromate. This value checks quite well with the 98.8% of completion value derived from the chemical analysis or total titanium concentration of the thermal product salt.

*Example II*

Example I was repeated using a charge in which the molar proportion of recrystallized anhydrous potassium fluotitanate to powdered titanium carbide was changed from 3:1 to 2:1. The procedure of Example I was followed except that the reaction was conducted at 925° C. for 8 hours. The recovered product was very deep reddish-purple with a thin layer of black material at the top of the salt cake. The black material was again scraped off and identified as carbon by X-ray examination. Chemical analysis showed that the deep reddish-purple cake contained 27.06% titanium. Since the proportions and temperature correspond to those for the production of the mixed fluotitanate, this would indicate 99.5% completion of the reaction when compared with a theoretical titanium content of 27.20% in the product if complete reaction takes place. The existence of the difluoride is evidenced by the evolution of hydrogen when the deep reddish-purple product is added to water and by the amount of reduction of potassium dichromate. By a titration similar to that described in Example I, it was computed that the thermal reaction of Example II proceeded to 97.9% of completion which value checks with the 98.8% derived from chemical analysis.

*Example III*

The procedure of Examples I and II was repeated with a charge consisting of pure recrystallized potassium fluotitanate and finely divided titanium carbide (−100 mesh) in equimolar proportions and at a temperature of 1000° C. for 8 hours. The recovered product was a very deep brown-purple with a thin flaky black layer at the top which again was identified by X-ray examination as carbon. Chemical analysis of the brown-purple product gave a value of 32.4% total titanium. Divalent potassium fluotitanate ($KTiF_3$) theoretically contains 33.23% titanium. Therefore the reaction had proceeded 97.5% toward completion of the formation of the complex potassium salt of titanium difluoride. When the brown-purple product was added to water, hydrogen gas was evolved, indicating the presence of the difluoride. A similar titration with potassium dichromate to the titration described in Example I indicated that the thermal reaction to produce the complex potassium salt of titanium difluoride had proceeded 97% to completion, further confirming the value of 97.5% obtained from analysis of the total titanium content of the salt product.

I claim:

1. The method of producing alkali metal fluotitanates in which the titanium has a valence of at least two and not greater than three which comprises bringing titanium carbide into contact with an alkali metal fluotitanate in which the titanium has a valence of four and maintaining the reactants at an elevated temperature between about 800° C. and about 1100° C. whereby they react to produce a product containing at least one alkali metal fluotitanate in which the titanium has a valence of at least two and not greater than three.

2. The method of producing alkali metal fluotitanates in which the titanium has a valence of at least two and not greater than three which comprises bringing finely divided titanium carbide into contact with an alkali metal fluotitanate in which the titanium has a valence of four, and maintaining the reactants at an elevated temperature between about 800° C. and about 1100° C. whereby they react to produce a product containing at least one alkali metal fluotitanate in which the titanium has a valence of at least two and not greater than three.

3. The method of claim 2 in which the titanium carbide is finer than 100 mesh (Tyler Standard).

4. The method of producing alkali metal fluotitanates in which the titanium has a valence of at least two and not greater than three which comprises bringing titanium carbide into contact with an alkali metal fluotitanate in which the titanium has a valence of four, and maintaining the reactants in an inert atmosphere at an elevated temperature between about 800° C. and about 1100° C. whereby they react to product a product containing at least one alkali metal fluotitanate in which the titanium has a valence of at least two and not greater than three.

5. The method of claim 4 in which the inert atmosphere is argon.

6. The method of producing alkali metal fluotitanates in which the titanium has a valence of at least two and not greater than three which comprises bringing titanium carbide into contact with an alkali metal fluotitanate in which the titanium has a valence of four in the proportion of one mol of titanium carbide to three mols of alkali metal fluotitanate, and maintaining the reactants at an elevated temperature between 800°–850° C. whereby they react to produce a product comprising an alkali metal fluotitanate in which the titanium has a valence of three.

7. The method of producing alkali metal fluotitanates in which the titanium has a valence of at least two and not greater than three which comprises bringing titanium carbide into contact with an alkali metal fluotitanate in which the titanium has a valence of four in equimolar proportions, and maintaining the reactants at an elevated temperature above 900° C. whereby they react to produce a product comprising an alkali metal fluotitanate in which the titanium has a valence of two.

8. The method of producing alkali metal fluotitanates in which the titanium has a valence of at least two and not greater than three which comprises bringing titanium carbide into contact with an alkali metal fluotitanate in which the titanium has a valence of four in equimolar proportions, and maintaining the reactants at an elevated temperature between 925° C. and 975° C. whereby they react to produce a product comprising an alkali metal fluotitanate in which the titanium has a valence of two.

9. The method of producing alkali metal fluotitanates in which the titanium has a valence of at least two and not greater than three which comprises bringing titanium carbide into contact with an alkali metal fluotitanate in which the titanium has a valence of four in equimolar proportions, and maintaining the reactants at an elevated temperature between 900° C. and 1100° C. whereby they react to produce a product comprising an alkali metal fluotitanate in which the titanium has a valence of two.

10. The method of producing alkali metal fluotitanates in which the titanium has a valence of at least two and not greater than three which comprises bringing titanium carbide into contact with an alkali metal fluotitanate in which the titanium has a valence of four in the proportion of one mol of titanium carbide to two mols of normal alkali fluotitanate, and maintaining the reactants at an elevated temperature between 850° and 900° C. whereby they react to produce a product consisting of a mixture of alkali metal fluotitanates in which the titanium has a valence of two and a valence of three.

11. The method of producing alkali metal fluotitanates in which the titanium has a valence of at least two and not greater than three which comprises bringing titanium carbide into contact with an alkali metal fluotitanate in which the titanium has a valence of four from the group consisting of sodium, potassium and lithium fluotitanates, and maintaining the reactants at an elevated temperature between about 800° C. and about 1100° C. whereby they react to produce a product containing at least one of the group of fluotitanates of sodium, potassium and lithium in which the titanium has a valence of at least two and not greater than three.

12. As a new composition of matter, a compound of divalent titanium of the formula $M_xTi_yF_z$, in which M is an alkali metal, $x$ is at least one and not over three, $y$ is at least one and not over two, $z$ is at least four, but not over five; and $x$, $y$ and $z$ are integers and in which $x$ plus $2y$ equals $z$.

13. The compound $K_2TiF_4$.

References Cited in the file of this patent

UNITED STATES PATENTS 2,672,399   Wainer et al. _____ Mar. 16, 1954

OTHER REFERENCES

Chemical Abstracts, vol. 43, page 10912.

J. W. Mellor's: "A Comprehensive Treatise on Inorganic and Theoretical Chemistry," vol. 7, 1927 ed., page 66. Longmans, Green & Co., New York.